Jan. 4, 1966  L. H. COMER  3,227,328
DISPENSING DEVICE WITH ROTATABLE SLEEVE
Filed June 3, 1964

INVENTOR
LAMAR H. COMER
BY
ATTORNEY

United States Patent Office 3,227,328
Patented Jan. 4, 1966

3,227,328
DISPENSING DEVICE WITH ROTATABLE SLEEVE
Lamar Harris Comer, 901 Vine St., San Jose, Calif.
Filed June 3, 1964, Ser. No. 372,318
4 Claims. (Cl. 222—363)

The present invention relates to a dispensing device and more particularly to a dispensing device in which a predetermined quantity of material may be discharged from the container in which it is held.

It is an object of the present invention to provide a device for insertion within a container, such as a soap container, a food container, cereal container, bulk containers for chemicals and the like, washing powder containers, and so on, so that the container may have a predetermined quantity of material discharged therefrom at one time by utilizing the measuring device of the present invention.

It is another object of the present invention to provide a relatively simple trap means positioned in a container so that the trap means can be disposed in communication with the main area of the container at one time and the box can be inverted so that the trap means is filled with a predetermined quantity of material from the main portion of the container, and thereafter the trap means may be operated so as to close off communication of the trap means with the main portion of the container and to permit the container to communicate with the exterior or external surface of the container so that a predetermined amount of material that is now disposed within the trap means may be discharged from the container.

It is another object of the present invention to provide a container having measuring means or compartment means therein which may be made of sufficient volume so as to hold a predetermined quantity of material in order to discharge this predetermined quantity of material from the container at one time.

It is another object of the present invention to provide a measuring device that can be readily disposed within a container and which consists of an outer sleeve or cylindrical member having an inlet and outlet therein with the inlet in communication with the main portion of the container and the outlet in communication with the external surface of the container, and with another member disposed within the sleeve member for communicating the inlet and the outlet of the sleeve member with the main portion of the container and the exterior of the container, as desired by the operator.

Various other objects and advantages of the present invention will be readily apparent from the following detailed description when considered in connection with the accompanying drawing forming a part thereof and in which.

Figure 1:
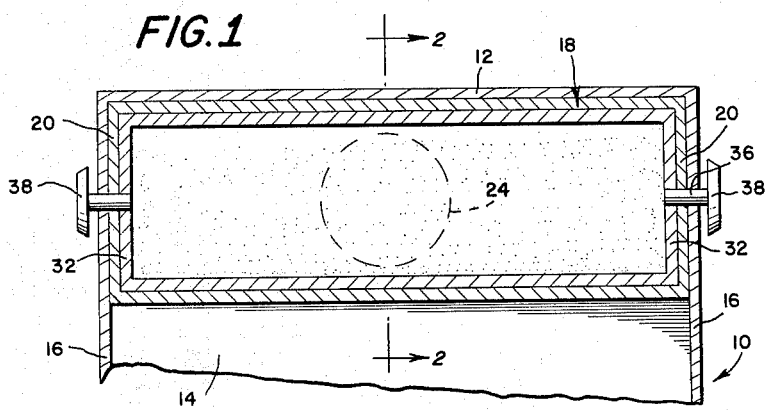
FIGURE 1 is a fragmentary side elevational view in section of the measuring device embodied in the present invention.

Referring to the drawings, the reference numeral 10 generally designates a container having a top wall 12 and side walls 14 and end walls 16, and a bottom wall. For purposes of illustration, the container will be considered a conventional container or cardboard box such as one in which various cereals or soap powder and the like are contained. It is of course realized that the container may be of different shapes and sizes and of different material and that the container per se does not constitute the invention.

Disposed within the upper end of the container 10 is a sleeve or cylindrical member 18 preferably made of plastic material, although it may be made of various other types of material. The cylindrical member 18 extends the full width of the box or is coextensive with the side walls 14. The opposite ends 20 of the sleeve are disposed adjacent the opposite end walls 16 and may be secured thereto by any suitable means such as cement, glue or the like if desired.

Figure 2:
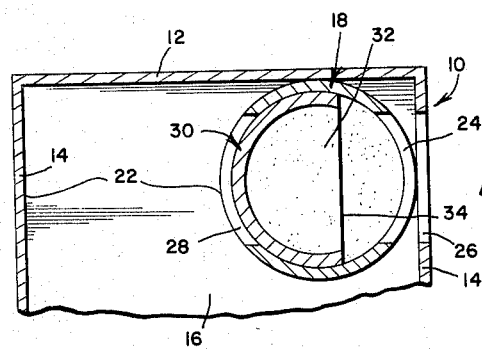
FIGURE 2 is a section taken along the lines 2—2 of FIGURE 1.

The diameter of the cylindrical member 18 as best seen in FIGURE 2 is substantially less than the width of the end walls 16 so that there is a large area or space 22 left in the top of the box adjacent the member 18. The member 18 is disposed to one side of the box and is provided with a discharge opening 24 in the side thereof which is in alignment with a discharge opening 26 in the upper end of the side wall 14, as best seen in FIGURE 2. The sleeve 18 is also provided with an inlet opening 28 for receiving material from the interior of the container so as to trap it or permit a measured quantity of material to be disposed within the device so as to discharge it through the outlet opening 26 of the container.

Disposed within the sleeve 18 is an inner member 30 which preferably consists of a semicircular or half-cylinder. The opposite ends of the inner member 30 are provided with semicircular end walls 32 and it will be noted as best seen in FIGURE 2 that one side 34 of the member 30 is open.

The inner member 30 and the outer sleeve 18 are secured together by pin members 36 extending therethrough at opposite ends thereof which pin members also extend through the end walls 16 of the container 10. The pins are provided with a dial or handle 38 thereon so that the semicircular sleeve member 30 may be rotated or turned with respect to the sleeve 18 fixed to the container.

When it is desired to measure a predetermined quantity of material in the container 10 for discharge from the container opening 26, the dials 38 are rotated so that the member 30 is positioned with its open side 34 in alignment with the inlet opening 28 of sleeve 18 and with its rear side closing off the outlet opening 24 of sleeve 18. Thereafter, the container 10 is inverted or manipulated or shaken so that material from the container 10 and the space 22 will fall through the opening 28 and fill the space within the sleeve 18. Thereafter, the dials or handles 28 are rotated so that the member 30 is turned to the position shown in FIGURE 2 to close off communication of the interior of sleeve 18 and inlet opening 28 with the interior of the container 10. At this position, the interior of the sleeve 18 is now in communication with the outlet opening 24 of the sleeve 18 and the outlet opening 26 of the container. The box is then inverted, manipulated or vibrated so as to shake out and discharge the material within the sleeve 18 from the container.

Figure 3:
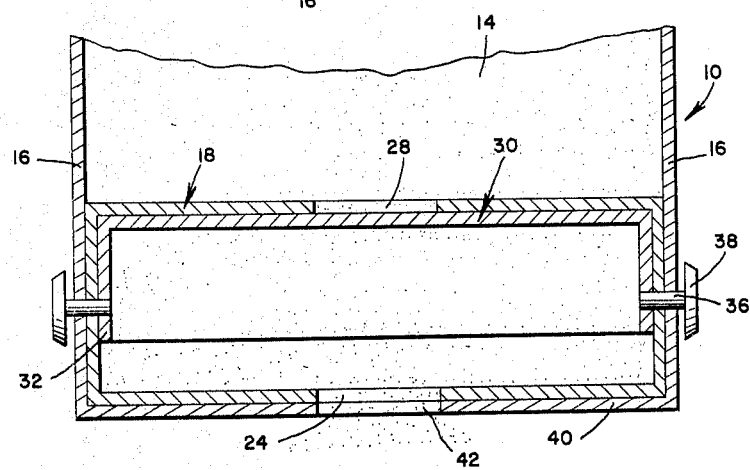
FIGURE 3 is another embodiment of the invention.

Referring to the embodiment shown in FIGURE 3, this is substantially the same in structure and in operation as the embodiment already described in connection with FIGURE 1, except that the device is disposed in the bottom of the container 10 with the inlet opening 28 in sleeve 18 disposed on the top of the sleeve and the discharge opening or outlet 24 in the sleeve 18 disposed in vertical alignment with the inlet opening 28 and adjacent the bottom 40 of the container. The container 40, instead of having a discharge outlet in the side thereof, is now provided with a discharge outlet or opening 42 in the bottom 40 in alignment with the outlet opening 24 of the sleeve 18. In this embodiment of the invention, the measuring device may if desired extend the full distance between the opposite side walls 14.

Inasmuch as various changes may be made in the form, location and relative arrangement of the several parts without departing from the essential characteristics of the invention, it will be understood that the invention is not to be limited except by the scope of the appended claims.

What is claimed is:

1. In combination a container having an outlet, a cylindrical closed member in said container having an outlet in communication with said container outlet and having an inlet in communication with the interior of said container, said cylindrical member being disposed adjacent the top of said container and secured to it and extending between the opposite end walls of the container, the diameter of the cylindrical member being substantially less than the distance between opposite sides of the container to provide a space in the container adjacent the cylindrical member inlet, said cylindrical member inlet and outlet being disposed in opposite sides of said cylindrical member, an inner semi-circular sleeve disposed within said cylindrical closed member, and pins fixed to the opposite ends of the semi-circular sleeve and extending through the container and cylindrical member for rotating said inner sleeve to one position to close off said cylindrical member inlet at one time while leaving the cylindrical member outlet open, and for rotating said inner sleeve to another position to open said cylindrical member inlet and close off said cylindrical member outlet at another time.

2. In combination a container having an outlet, a cylindrical closed member in said container having an outlet in communication with said container outlet and having an inlet in communication with the interior of said container, said cylindrical member being completely enclosed within the container material holding portion and secured to it and extending between the opposite end walls of the container, the diameter of the cylindrical member being substantially less than the distance between opposite sides of the container to provide a space in the container adjacent the cylindrical member inlet, said cylindrical member inlet and outlet being disposed in opposite sides of said cylindrical member, an inner semi-circular sleeve disposed within said cylindrical closed member, and pins fixed to the opposite ends of the semi-circular sleeve and extending through the container and cylindrical member for rotating said inner sleeve to one position to close off said cylindrical member inlet at one time while leaving the cylindrical member outlet open, and for rotating said inner sleeve to another position to open said cylindrical member inlet and close off said cylindrical member outlet at another time.

3. The combination of claim 2 wherein said cylindrical member is secured to the bottom wall of said container.

4. The combination of claim 2 wherein said cylindrical member is secured to the top wall of said container.

References Cited by the Examiner

UNITED STATES PATENTS

| | | | |
|---|---|---|---|
| 934,182 | 9/1909 | Jopling | 222—363 X |
| 1,394,210 | 10/1921 | Miller | 222—368 X |

LOUIS J. DEMBO, *Primary Examiner.*